Jan. 14, 1964 G. N. LOCH 3,117,825
DETACHABLE SHOVEL MEANS FOR PLOW BEAMS AND THE LIKE
Filed Nov. 10, 1961
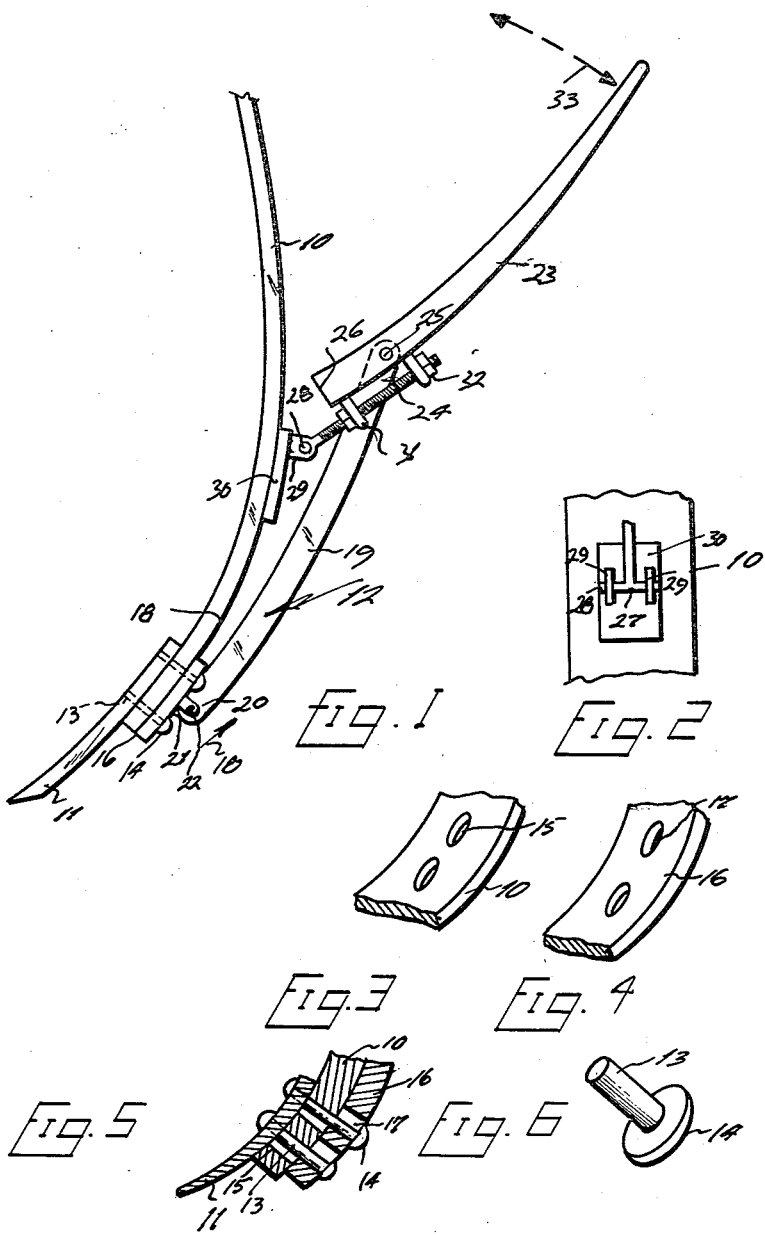
INVENTOR.
GEORGE LOCH

United States Patent Office 3,117,825
Patented Jan. 14, 1964

3,117,825
DETACHABLE SHOVEL MEANS FOR PLOW
BEAMS AND THE LIKE
George N. Loch, Box 14, Glendon, Alberta, Canada
Filed Nov. 10, 1961, Ser. No. 151,556
3 Claims. (Cl. 306—1.6)

My invention relates to new and useful improvements in detachable shovel means for plow beams and the like.

Normally such plow shovels are bolted or otherwise secured to the lower ends of the plow beams so that when it is desired to move the plow shovels, considerable difficulty is normally encountered due to rust and corrosion occurring at the bolts. Furthermore, the action of the plow shovels within stony or hard ground burrs the ends of the screw threaded bolts normally holding the shovels into position thus also adding to the difficulty in removal.

The above mentioned difficulty is time consuming and ties up the machine for a considerable length of time when it is desired to renew or replace the plow shovels.

By providing an over center locking action in combination with a slotted locking plate, I can attach or detach the plow shovels rapidly and easily and without the use of tools.

The principal object and essence of my invention is therefore to provide a device of the character herewithin described which facilitates the removal and replacement of plow shovels on plow beams.

Another object of my invention is to provide a device of the character herewithin described which includes an over center locking action which is adjustable within limits.

A still further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of my device.

FIGURE 2 is a fragmentary end elevation showing the attachment of the adjusting bolt to the plow beam.

FIGURE 3 is a fragmentary perspective view of the lower end of the plow beam.

FIGURE 4 is a perspective view of the locking plate per se.

FIGURE 5 is a fragmentary cross sectional view showing the relationship of the shovel, the plow beam and the locking plate.

FIGURE 6 is an enlarged perspective view of one of the shovel bolts.

In the drawings like characters of reference indicate corresponding parts in the different figures.

Proceeding therefore to describe my invention in detail, reference should be made to the accompanying drawings in which reference character 10 illustrates a conventional downwardly curved plow beam with a plow shovel 11 detachably secured upon the end thereof by means of my device, collectively designated 12.

The plow shovel 11 is provided with a pair of bolts 13 extending from the underside thereof and passing through the shovel to be secured firmly to the shovel either by riveting or welding.

The heads 14 of the bolts are oval shaped as shown in FIGURE 6 and are adapted to pass through elongated apertures 15 formed through the end of the associated plow beam 10 as shown in FIGURE 3.

When the shovel is placed in position upon the plow beam as shown in FIGURE 1, the bolts and heads extend through the plow beam and protrude upon the opposite side so that a locking plate 16 can also engage over the heads due to elongated apertures 17 being formed through the locking plate.

The locking plate is preferably curved to nest against the rear side 18 of the plow beam when in position so that the heads just pass through the locking plate and protrude upon the opposite side.

From the foregoing it will be appreciated that if the locking plate is then moved upwardly in the direction of arrow 18, it will take up the position shown in FIGURE 5 so that the heads engage the boundaries of the apertures and prevent the shovel from being displaced from the plow beam.

This upward movement is accomplished by means of a curved locking brace 19 pivotally secured by the lower end 20 thereof to the rear side 21 of the locking plate by means of pin 22.

A locking lever 23 is pivotally secured to the opposite end 24 of the locking brace 19 by means of pin 25, said pivotal attachement being adjacent the inner end 26 of the locking lever.

This locking lever is in turn, secured to the plow beam 10 by means of a T-bolt 27, the head 28 of which engages through a pair of lugs 29 secured to and extending from a reinforcing plate 30 welded to the rear side 18 of the plow beam 10.

This T-bolt is screw threaded along the length thereof and passes through a pair of ears or lugs 31 secured to the locking lever adjacent the end 26 thereof. Adjustment of the locking lever with relation to the pivot point 25 is accomplished by a pair of nuts 32 engaging the screw threaded shank of the bolt 27 upon each side of the ears 31 as clearly shown in FIGURE 1.

This provides an over center action for the locking lever 23 which is designed to operate in the direction of double headed arrows 33 so that when it is moved so that it lies parallel with the plow beam, the locking plate 16 is pulled upwardly into the position shown in FIG. 5 thus preventing displacement of the shovel 11. However, when it is desired to replace the shovel, the lever is moved away from the beam as shown in FIGURE 1 thus moving the locking plate downwardly and permitting the shovel to be detached from the beam.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. Means for attaching and detaching a plow shovel to a plow beam or the like comprising in combination at least two bolts secured to the underside of the associated shovel end and extending therefrom, heads on said bolts, the associated plow beam being provided with elongated apertures, said bolts extending through said apertures whereby said heads protrude therethrough to the underside of said beam, a locking plate provided with elongated apertures and lying against the underside of the associated plow beam, said heads protruding through the apertures in said locking plate, a locking brace pivotally secured by one end thereof to said locking plate and extending upwardly at the rear of said plow beam and over center locking means pivotally secured between the other end of said locking brace and said associated plow beam and adapted, when moved to the locked position, to move said locking plate into head engaging relationship with said bolts thereby locking said plow shovel to said plow beam.

2. The device according to claim 1 in which over center locking means is adjustable.

3. The device according to claim 2 in which said over center locking means includes a locking lever pivotally secured by one end thereof to the associated plow beam, the other end of said locking brace being pivotally connected to said locking lever adjacent said one end, said adjustable means including a bolt pivotally connected by one end thereof to said plow beam, a pair of flanges on said one end of said locking lever, said bolts screw threadably engaging said flanges for limited adjustment of said over center action.

References Cited in the file of this patent

UNITED STATES PATENTS

| 871,259 | Dorman | Nov. 19, 1907 |
| 1,074,857 | Glenn | Oct. 7, 1913 |
| 1,273,621 | Kirkpatrick | July 23, 1918 |
| 2,634,094 | Kojan | Apr. 7, 1953 |